Jenks & Gardner,
Stone Drill.
Nº 17,766.        Patented July 7, 1857.
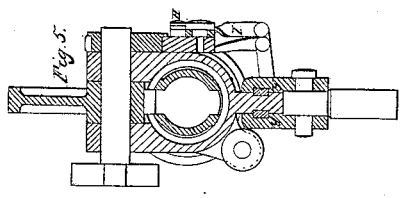
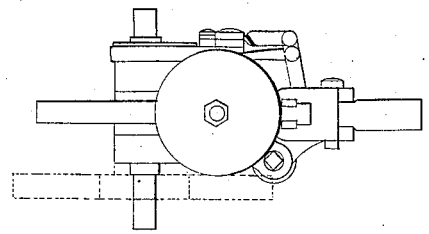
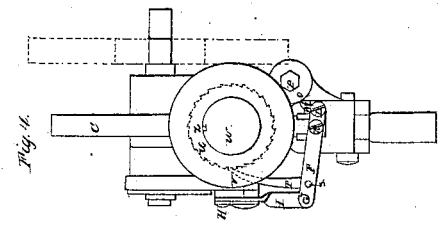
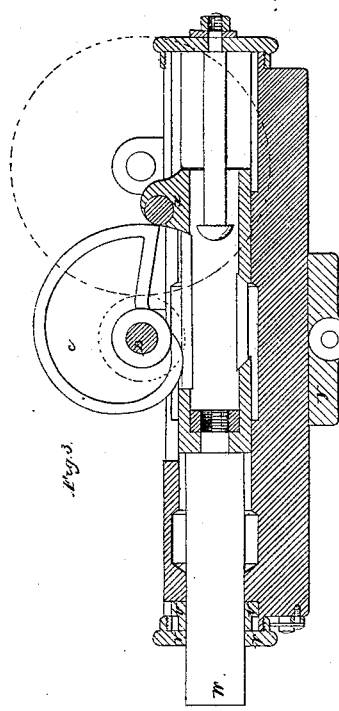
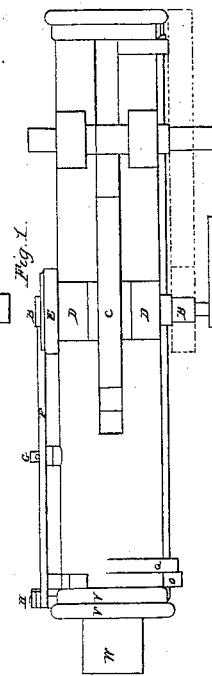
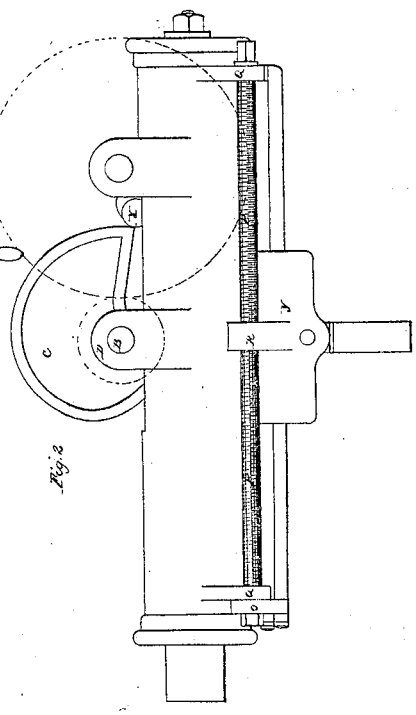

UNITED STATES PATENT OFFICE.

LEMUEL P. JENKS, OF BOSTON, MASSACHUSETTS, AND GEO. A. GARDNER, OF NEW YORK, N. Y., ASSIGNORS TO GEO. A. GARDNER.

ROCK-DRILLING MACHINE.

Specification of Letters Patent No. 17,766, dated July 7, 1857.

*To all whom it may concern:*

Be it known that we, LEMUEL P. JENKS, of Boston, county of Suffolk, and State of Massachusetts, and GEORGE ARTHUR GARDNER, of New York city, county, and State, have invented a new and Improved Machine for the Purpose of Drilling Rocks; and we do hereby declare that the following is a full and exact description thereof, reference being had to the accompanying drawings and to the letters of reference marked thereon.

The nature of our invention consists in such an arrangement of parts that the mandrel screw shaft, ratchet, etc., for the purpose of rotating and feeding forward into the rock a steel or iron drill are all operated from one or more eccentrics on the cam shaft.

In the drawings Figures 1, 2, 3, 4, and 5 represent the machine; Fig. 1, plan from above; Fig. 2, side elevation; Fig. 3, longitudinal section; Fig. 4, front or lower end view; Fig. 5, cross section at the center.

A, Fig. 1, is a crank from which the prime motion is derived.

B is the main shaft turned by it, supported by the bearings D D (Fig. 1) and bearing the cam wheel C (Figs. 1, 2, 3, and 4).

E (Fig. 1) is an eccentric playing on the shaft B supported loosely on this shaft and worked by the eccentric is the bar F supported at the fixed pin or pivot G (Fig. 1). At the other end of this bar and joined loosely to it by the rivet H (Figs. 1 and 4) is the second bar I (Fig. 4) at nearly right angles to F. By means of the rivet J, this second bar I is connected with the third bar $I^2$ (Fig. 4) working on the fixed pin or pivot K (Fig. 4). At the farther end of this third bar $I^2$ is connected by the rivet L (Fig. 4) the pawl M (Fig. 4). This pawl M works into the ratchet wheel O (Fig. 4) firmly attached to the screw shaft P (Figs. 4 and 2). This screw shaft P plays in the bearings Q Q (Fig 2) and by means of its rotation, the female screw or nut R (Fig. 2) which is firmly fixed to the frame work Y (see Figs. 2 and 5) forces the whole frame work (bearing the crank A, cam wheel C, etc., etc.) along the fixed slide Y (see Figs. 2 and 5). This explains the feeding motion.

The turning motion derived from the same eccentric E is now to be described. The working by means of the crank A, crank shaft B, eccentric E and first bar F, causing as we have seen, the working (or raising and lowering) of the bar $I^2$ (see Fig. 4) the pawl T (Fig. 4) connected with bar $I^2$ by means of the rivet S (Fig. 4) catching in the teeth of the ratchet wheel U (Fig. 3) (back of the end piece V, as viewed in Fig. 4) rotates the ratchet wheel U (see Fig. 4). This ratchet wheel is kept in its place by the end piece V (Fig. 3) and the solid part of the frame (see Fig. 3), and by means of the spline Z (Fig. 4) sliding in its corresponding slot in the mandrel W, this causes the mandrel to rotate with the ratchet wheel; the mandrel, however is not prevented from being turned by hand, when desired, for the purpose of examining the condition of the drill, &c.

A very important feature of this invention and to which we desire to call attention is the simplicity and compactness of the portions of machinery described, whereby the machine can be used in confined places in mines and elsewhere.

What we claim herein as of our invention and desire to secure by Letters Patent, is—

The peculiar combination and arrangement of the devices above described whereby the rotation of the mandrel and drill as well as the gradual and proper advancement of both drill mandrel and frame or either of them is effected by means of a single eccentric on the cam shaft B in the manner and for the purposes above set forth.

LEML. P. JENKS.
G. ARTHUR GARDNER.

Witnesses as to the signature of Leml. P. Jenks:
FRANCIS BOWMAN,
A. G. BAXTER.

Witnesses as to the signature of G. Arthur Gardner:
J. W. CALDWELL,
HENRY B. TURNER.